(12) United States Patent
Foster et al.

(10) Patent No.: US 11,357,153 B2
(45) Date of Patent: Jun. 14, 2022

(54) SYSTEM AND METHOD FOR DETERMINING SOIL CLOD SIZE USING CAPTURED IMAGES OF A FIELD

(71) Applicant: CNH Industrial Canada, Ltd., Saskatoon (CA)

(72) Inventors: Christopher A. Foster, Mohnton, PA (US); James W. Henry, Saskatoon (CA); Luca Ferrari, Modena (IT)

(73) Assignee: CNH Industrial Canada, Ltd., Saskatoon (CA)

( * ) Notice: Subject to any disclaimer, the term of this patent is extended or adjusted under 35 U.S.C. 154(b) by 130 days.

(21) Appl. No.: 16/710,384

(22) Filed: Dec. 11, 2019

(65) Prior Publication Data

US 2021/0176909 A1    Jun. 17, 2021

(51) Int. Cl.
  *A01B 35/32*  (2006.01)
  *G06T 7/00*   (2017.01)
  *A01B 79/00*  (2006.01)

(52) U.S. Cl.
  CPC ............ *A01B 35/32* (2013.01); *A01B 79/005* (2013.01); *G06T 7/0002* (2013.01); *G06T 2207/30188* (2013.01)

(58) Field of Classification Search
  None
  See application file for complete search history.

(56) References Cited

U.S. PATENT DOCUMENTS

| | | | |
|---|---|---|---|
| 5,462,122 A | 10/1995 | Yamamoto et al. | |
| 9,489,576 B2 | 11/2016 | Johnson et al. | |
| 9,554,098 B2 | 1/2017 | Casper et al. | |
| 9,883,626 B2 | 2/2018 | Heim et al. | |
| 10,123,475 B2 | 11/2018 | Posselius et al. | |
| 10,182,214 B2* | 1/2019 | Gornik | G06T 7/0004 |
| 10,650,538 B2* | 5/2020 | Ferrari | G06K 9/4642 |
| 11,001,380 B2* | 5/2021 | Nahuel-Andrejuk | G05D 1/0094 |
| 2016/0029547 A1 | 2/2016 | Casper et al. | |
| 2018/0174291 A1 | 6/2018 | Asada et al. | |
| 2018/0206393 A1 | 7/2018 | Stoller et al. | |
| 2018/0210450 A1 | 7/2018 | Ferrari et al. | |
| 2018/0336410 A1 | 11/2018 | Posselius | |

(Continued)

FOREIGN PATENT DOCUMENTS

| JP | 4894833 | 3/2012 |
|---|---|---|
| WO | WO2014105928 | 7/2014 |

*Primary Examiner* — Tahmina N Ansari

(74) *Attorney, Agent, or Firm* — Rebecca L. Henkel; Rickard K. DeMille

(57) ABSTRACT

In one aspect, a system for determining soil clod size as an implement is being towed across a field by a work vehicle may include an imaging device provided in operative association with the work vehicle or the implement such that the imaging device is configured to capture images of the field. Furthermore, the system may include a controller communicatively coupled to the imaging device. The controller may be configured to receive, from the imaging device, image data associated with an imaged portion of the field. Moreover, the controller may be configured analyze the received image data to identify at least one edge of a soil clod within the imaged portion of the field. Additionally, the controller may be configured to determine a size of the soil clod based on the identified at least one edge of the soil clod.

19 Claims, 5 Drawing Sheets

(56) References Cited

U.S. PATENT DOCUMENTS

| | | | |
|---|---|---|---|
| 2018/0373932 A1 | 12/2018 | Albrecht et al. | |
| 2020/0005474 A1* | 1/2020 | Ferrari | G06T 7/44 |
| 2020/0352088 A1* | 11/2020 | Arnett | A01C 5/062 |
| 2021/0056721 A1* | 2/2021 | Barrick | A01B 69/001 |
| 2021/0176909 A1* | 6/2021 | Foster | G06T 7/0002 |

* cited by examiner

SYSTEM AND METHOD FOR DETERMINING SOIL CLOD SIZE USING CAPTURED IMAGES OF A FIELD

FIELD OF THE INVENTION

The present disclosure generally relates to systems and methods for determining soil clod size and, more particularly, to systems and methods for determining soil clod size based on captured images of a field across which an implement is being towed by a work vehicle.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools, such as harrow discs, shanks, leveling discs, tines, rolling baskets, and/or the like, which loosen and/or otherwise agitate the soil to prepare the soil for subsequent planting operations.

Upon completion of the tillage operation, it is generally desirable that the sizes of any soil clods present on the surface of the field be less than a predetermined clod size. In this regard, it may be necessary to adjust one or more operating parameters of the tillage implement during the tillage operation to ensure that sizes of the soil clods within the field remain the predetermined clod size. However, it may be difficult for the tillage implement operator to accurately determine soil clod size while performing the tillage operation.

Accordingly, an improved system and method for determining soil clod size would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining soil clod as an implement is being towed across a field by a work vehicle. The system may include an imaging device provided in operative association with one of the work vehicle or the implement such that the imaging device is configured to capture images of the field. Furthermore, the system may include a controller communicatively coupled to the imaging device. The controller may, in turn, include a processor and associated memory, the memory storing instructions that, when implemented by the processor, configure the controller to receive, from the imaging device, image data associated with an imaged portion of the field. Moreover, the controller may be configured analyze the received image data to identify at least one edge of a soil clod within the imaged portion of the field. Additionally, the controller may be configured to determine a size of the soil clod based on the identified at least one edge of the soil clod.

In another aspect, the present subject matter is directed to a method for determining soil clod size as an implement is being towed across a field by a work vehicle. The method may include receiving, with one or more computing devices, image data associated with an imaged portion of a field as the implement is being towed across the field by the work vehicle. Furthermore, the method may include analyzing, with the one or more computing devices, the received image data to identify at least one edge of a soil clod within the imaged portion of the field. Additionally, the method may include determining, with the one or more computing devices, a size of the soil clod based on the identified at least one edge of the soil clod.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
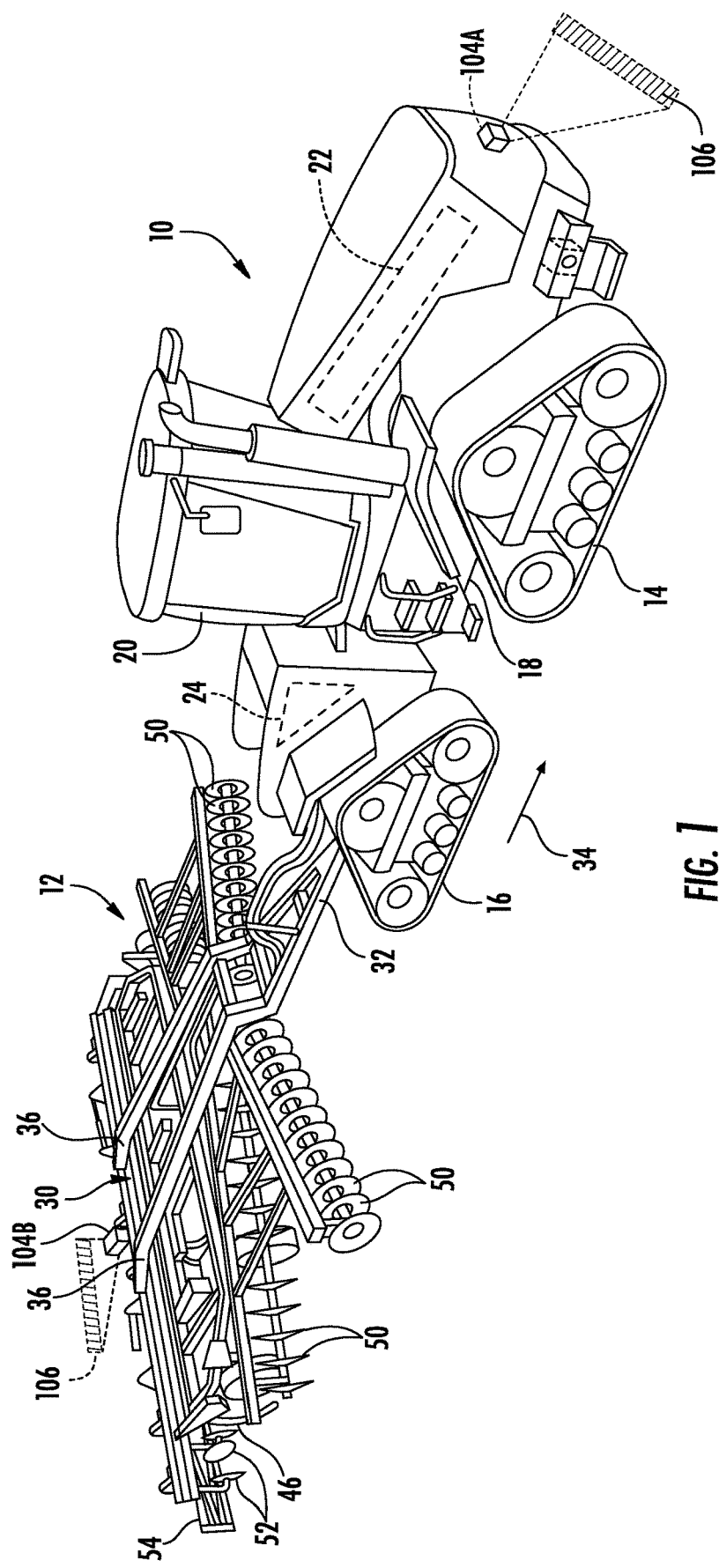
FIG. 1 illustrates a perspective view of one embodiment of a work vehicle towing an implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining soil clod size as an implement is being towed across a field by a work vehicle. Specifically, in several embodiments, one or more imaging devices may be provided in operative association with the work vehicle and/or the implement. In this regard, as the vehicle/implement travels across the field to perform an agricultural operation (e.g., a tillage operation) thereon, the imaging device(s) may be configured to capture images or other image data of a field. The captured images may then be analyzed by an associated controller to determine the size(s) of one or more soil clods present on the surface of the field. Thereafter, the controller may be configured to adjust one or more operating parameters of the vehicle and/or implement based on the determine size(s) of the soil clod(s). For example, in one embodiment, the controller may be configured to initiate an increase in the force being applied to one or more basket assemblies of the implement when the determined size(s) of the soil clod(s) exceeds a predetermined maximum soil clod size.

In accordance with aspects of the present subject matter, the controller may be configured to determine the size(s) of the soil clod(s) based the edge(s) of the soil clod(s). Specifically, in several embodiments, the controller may be configured to analyze one or more captured image(s) to identify one or more edge(s) of the soil clod(s) present within the imaged portion of the field. For example, in one embodiment, the controller may be configured to locate the edge(s) using a suitable edge-finding technique. Moreover, the controller may be configured to identify the perimeter(s) of the soil clod(s) based on the identified edge(s) using a suitable boundary-tracing technique. Thereafter, in one embodiment, the controller may be configured to determine the size(s) of the soil clod(s) based on the area(s) enclosed by the associated identified perimeter(s). In another embodiment, the controller may be configured to determine the size(s) of the soil clod(s) based on the maximum dimension(s) (e.g., the length(s)) of the associated identified perimeter(s).

Figure 2:
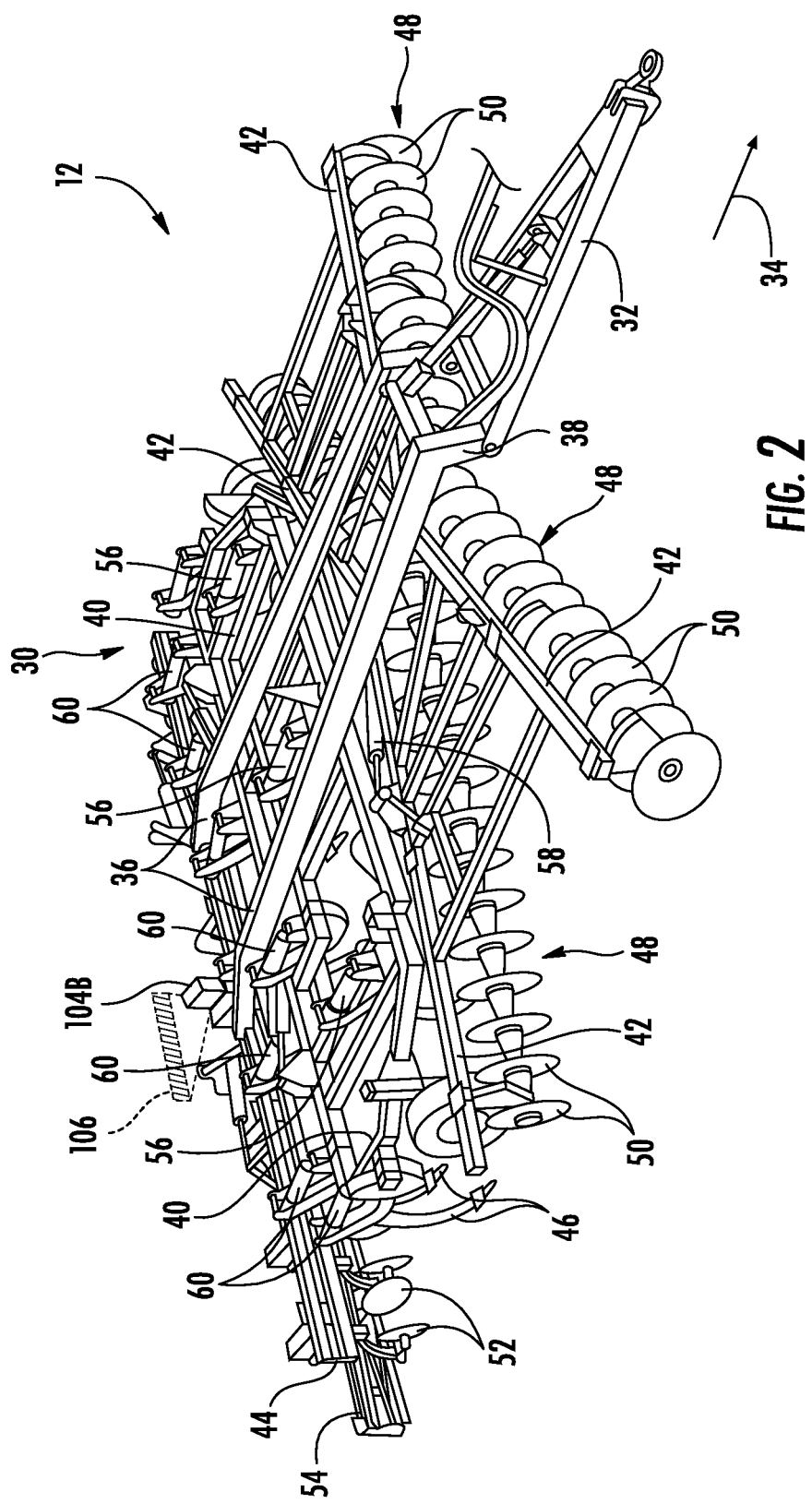
FIG. 2 illustrates a perspective view of the implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor and the implement 12 is configured as a tillage implement. However, in other embodiments, the work vehicle 10 may be configured as any other suitable agricultural vehicle. Furthermore, in alternative embodiments, the implement 12 may be configured as any other suitable agricultural implement.

As particularly shown in FIG. 1, the work vehicle 10 includes a pair of front track assemblies 14, a pair or rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, the work vehicle 10 may include an engine 22 and a transmission 24 mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 30 configured to be towed by the work vehicle 10 via a pull hitch or tow bar 32 in a travel direction of the vehicle (e.g., as indicated by arrow 34). In general, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame 44 is configured to support a plurality of leveling blades 52 and rolling (or crumbler) basket assemblies 54. However, in other embodiments, any other suitable ground-engaging tools may be coupled to and supported by the aft frame 44, such as a plurality of closing disks.

In addition, the implement 12 may also include any number of suitable actuators (e.g., hydraulic cylinders) for adjusting the relative positioning, penetration depth, and/or down force associated with the various ground-engaging tools 46, 50, 52, 54. For instance, the implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the implement 12 may include one or more second actuators 58 coupled to the disk forward frame 42 to adjust the penetration depth and/or the down pressure of the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10 or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 44 of the implement 12.

Additionally, in accordance with aspects of the present subject matter, the work vehicle 10 and/or the implement 12 may include one or more imaging devices coupled thereto and/or supported thereon for capturing images or other image data associated with the field as an operation is being performed via the implement 12. Specifically, in several embodiments, the imaging device(s) may be provided in operative association with the work vehicle 10 and/or the implement 12 such that the imaging device(s) has a field of view directed towards a portion(s) of the field disposed in front of, behind, and/or along one or both of the sides of the work vehicle 10 and/or the implement 12 as the implement 12 is being towed across the field. As such, the imaging device(s) may capture images from the vehicle 10 and/or implement 12 of one or more portion(s) of the field being passed by the vehicle 10 and/or implement 12.

In general, the imaging device(s) may correspond to any suitable device(s) configured to capture images or other image data of the soil surface of the field that allows the soil clods present on the top surface of the field to be identified. For instance, in several embodiments, the imaging device(s) may correspond to any suitable camera(s), such as single-spectrum camera or a multi-spectrum camera configured to capture images in the visible light range and/or infrared spectral ranges. Additionally, in one embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the imaging device(s) may correspond to any other suitable image capture device(s) and/or vision system(s) that is capable of capturing "images" or other image-like data that allows one or more soil clods present on the top surface of the field to be identified. For example, in one embodiment, the imaging device(s) may correspond to a light detection and ranging (LIDAR) device(s).

In several embodiments, two or more imaging devices may be provided in operative association with the work vehicle 10 and/or the implement 12. For instance, as shown in FIGS. 1 and 2, in one embodiment, a first imaging device 104A may be coupled to the front of the work vehicle 10 such that the imaging device 104A has a field of view 106 that allows it to capture images of an adjacent area or portion of the field disposed in front of the work vehicle 10. For instance, the field of view 106 of the imaging device 104A may be directed outwardly from the front of the work vehicle 10 along a plane or reference line that extends generally parallel to the travel direction 34 of the work vehicle 10. Similarly, as shown in FIGS. 1 and 2, a second imaging device 104B may be coupled to the rear of the implement 12 such that the imaging device 104B has a field of view 106 that allows it to capture images of an adjacent area or portion of the field disposed aft of the implement 12. For instance, the field of view 106 of the imaging device 104B may be directed outwardly from the rear of the implement 12 along a plane or reference line that extends generally parallel to the travel direction 34 of the work vehicle 10.

By capturing image data at a location forward of the ground-engaging tools 46, 50, 52, 54 of the implement 12 (e.g., at the location detected by the first imaging device 104) and at a location aft of the ground-engaging tools 46, 50, 52, 54 (e.g., at the location detected by the second imaging device 104B) as the work vehicle 10 tows the implement 12 to allow an agricultural operation to be performed along a given section of the field, the imaging devices 104A, 104B may be used to collect images both before and after the performance of the ground-engaging operation. As will be described below, by analyzing the pre-operation and post-operation images captured by the imaging devices 104A, 104B, an associated controller 102 (FIG. 3) may then be configured to calculate or estimate a soil clod size reduction for the field that provides an indication of the current effectiveness of the implement 12 in adjusting the soil clod size of the field. Based on the estimated soil clod size reduction, the controller 102 may, for example, control/adjust the operation of the work vehicle 10 and/or the implement 12, as necessary, to ensure that the soil clod size reduction is maintained at a given target value and/or within a given target range (e.g., an operating range defined around a target soil clod size reduction desired for the specific agricultural operation being performed within the field).

It should be appreciated that, in alternative embodiments, the imaging device(s) 104A, 104B may be installed at any other suitable location(s) that allows the imaging device(s) 104A, 104B to capture image data before and after the performance of the associated ground-engaging operation. For example, as an alternative to positioning the first imaging device 104A at the front of the vehicle 10, such imaging device 104A may be coupled to one of the sides of the work vehicle 10 or the implement 12 such that the imaging device 104A has a field of view 106 that allows it to capture images of an adjacent area or portion of the field disposed along such side of the work vehicle 10 or the implement 12. Moreover, as an alternative to positioning the second imaging device 104B at the rear of the implement 12, such imaging device 104B may be coupled to other of the sides of the work vehicle 10 or the implement 12 such that the imaging device 104B has a field of view 106 that allows it to capture images of an adjacent area or portion of the field disposed along such side of the work vehicle 10 or the implement 12. However, in alternative embodiments, the imaging device(s) 104A, 104B may be mounted at any other suitable location(s) on the vehicle 10 and/or the implement 12.

Additionally, it should be appreciated that, although the embodiments shown in FIGS. 1 and 2 illustrate two imaging devices 104A, 104B installed on the work vehicle 10 and/or the implement 12, a single imaging device may be installed relative to the work vehicle 10 and/or the implement 12 to allow images of the field to be captured. For instance, in one embodiment, it may be desirable to only have a single image device that captures images either before or after the agricultural operation is performed. Alternatively, a single imaging device may be used to capture images both before and after the agricultural operation is performed. For instance, by making a second pass across the same portion of the field or by mounting the imaging device along the side of the work vehicle 10 or the implement 12, before and after image data for same section of the field may be captured using a single imaging device. Furthermore, in other embodiments, more than two imaging devices may be installed relative to the work vehicle 10 and/or the implement 12 to allow images for the field to be captured.

Figure 3:
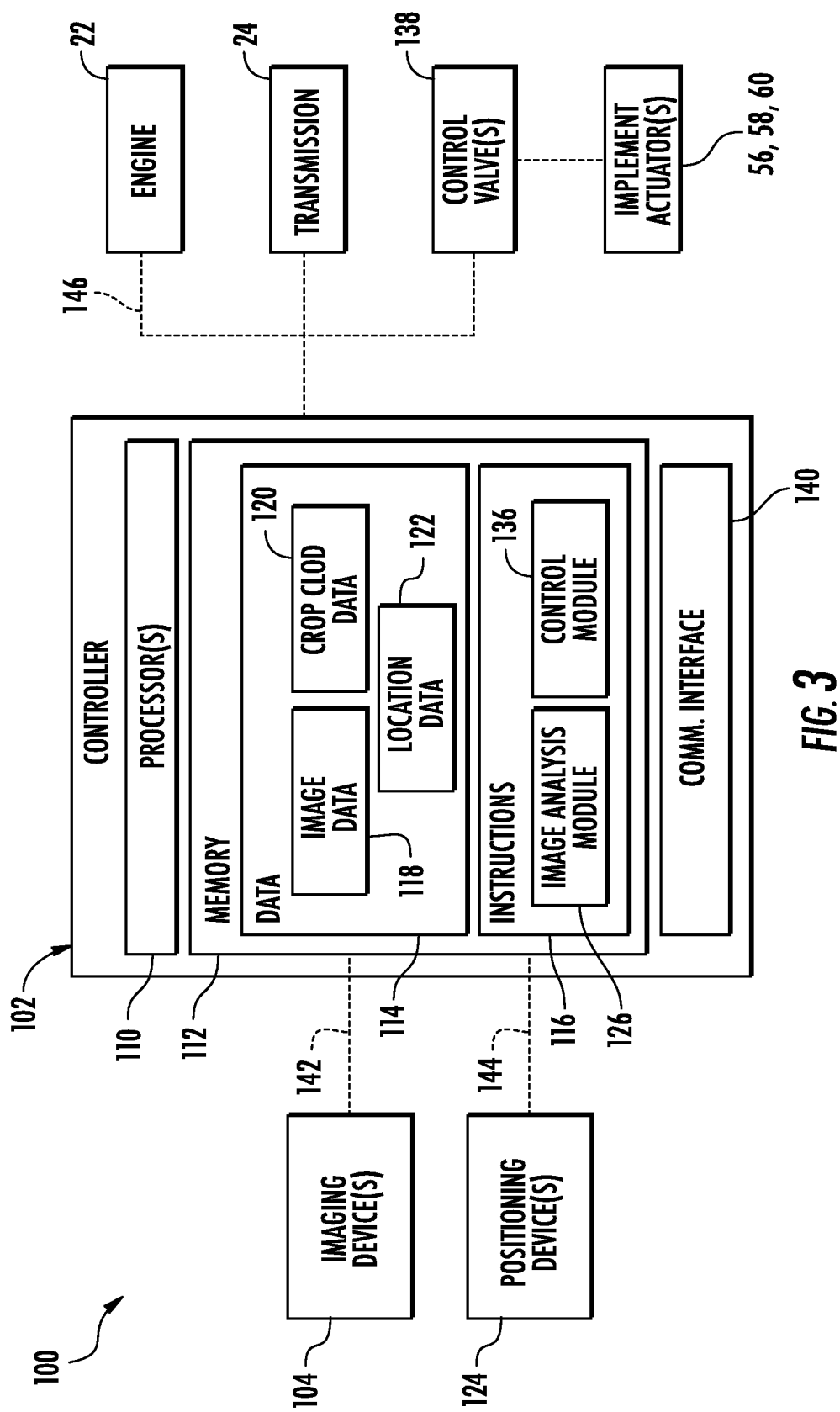
FIG. 3 illustrates a schematic view of one embodiment of a system for determining soil clod size as an implement is being towed across a field by a work vehicle in accordance with aspects of the present subject matter.

Referring now to FIG. 3, a schematic view of one embodiment of a system 100 for determining soil clod size as an implement is being towed across a field by a work vehicle is illustrated in accordance with aspects of the present subject matter. In general, the system 100 will be described herein with reference to the work vehicle 10 and the implement 12 described above with reference to FIGS. 1 and 2. However, it should be appreciated by those of ordinary skill in the art that the disclosed system 100 may generally be utilized with work vehicles having any other suitable vehicle configuration and/or implements having any other suitable implement configuration.

In several embodiments, the system 100 may include a controller 102 and various other components configured to be communicatively coupled to and/or controlled by the controller 102, such as one or more imaging devices 104 and/or various components of the work vehicle 10 and/or the implement 12. As will be described in greater detail below, the controller 102 may be configured to receive images or other image data from the imaging device(s) 104 that depict portions of the field as an operation (e.g., a tillage operation) is being performed within the field. Thereafter, the controller 102 may be configured to analyze the received images (e.g., using edge detection and/or boundary tracing techniques) to estimate or determine the size(s) of one or more soil clods present on the surface of the field. As indicated above, in one embodiment, images may be captured by the imaging device(s) 104 for the same section of the field both before and after the ground-engaging operation has been performed. In such an embodiment, the controller 102 may be configured to analyze the pre-operation and post-operation data to determine a soil clod size reduction for the analyzed section of the field. Moreover, based on the analysis of the image data, the controller 102 may also be configured to adjust the operation of the work vehicle 10 and/or the implement 12, as necessary, to ensure that the soil clod size of the field is maintained at a given target value and/or within a given target range.

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include an image database 118 for storing images or other image data received from the imaging device(s) 104. For example, the imaging device(s) 104 may be configured to continuously or periodically capture images of adjacent portion(s) of the field as an agricultural operation is being performed on the field. In such an embodiment, the images transmitted to the controller 102 from the imaging device(s) 104 may be stored within the image database 118 for subsequent processing and/or analysis. It should be appreciated that, as used herein, the term image data may include any suitable type of data received from the imaging device(s) 104 that allows for the size(s) of the soil clods present on the surface of a field to be analyzed, including photographs and other image-related data (e.g., scan data and/or the like).

Additionally, as shown in FIG. 3, the memory 112 may include a soil clod database 120 for storing information related to the size(s) of the soil clod(s) present on the surface of the field being processed. For example, as indicated above, based on the images received from the imaging device(s) 104, the controller 102 may be configured to estimate or determine the size(s) of one or more soil clods present on the surface of the field using one more image processing techniques (e.g., edge detection and/or boundary tracing techniques). The soil clod size(s) estimated or determined by the controller 102 may then be stored within the soil clod database 120 for subsequent processing and/or analysis.

Moreover, in several embodiments, the memory 112 may also include a location database 122 storing location information about the work vehicle/implement 10, 12 and/or information about the field being processed (e.g., a field map). Specifically, as shown in FIG. 3, the controller 102 may be communicatively coupled to a positioning device(s) 124 installed on or within the work vehicle 10 and/or on or within the implement 12. For example, in one embodiment, the positioning device(s) 124 may be configured to determine the current location of the work vehicle 10 and/or the implement 12 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form coordinates) and subsequently stored within the location database 122 for subsequent processing and/or analysis.

Additionally, in several embodiments, the location data stored within the location database 122 may also be correlated to the images stored within the image database 118. For instance, in one embodiment, the location coordinates derived from the positioning device(s) 124 and the images captured by the imaging device(s) 104 may both be time-stamped. In such an embodiment, the time-stamped data may allow each image captured by the imaging device(s) 104 to be matched or correlated to a corresponding set of location coordinates received from the positioning device(s) 124, thereby allowing the precise location of the portion of the field depicted within a given image to be known (or at least capable of calculation) by the controller 102.

Moreover, by matching each image to a corresponding set of location coordinates, the controller 102 may also be configured to generate or update a corresponding field map associated with the field being processed. For example, in instances in which the controller 102 already includes a field map stored within its memory 112 that includes location coordinates associated with various points across the field, the soil clod size value(s) determined from each image captured by the imaging device(s) 104 may be mapped or correlated to a given location within the field map. Alternatively, based on the location data and the associated image data, the controller 102 may be configured to generate a field map for the field that includes the geo-located images associated therewith.

Referring still to FIG. 3, in several embodiments, the instructions 116 stored within the memory 112 of the controller 102 may be executed by the processor(s) 110 to implement an image analysis module 126. In general, the image analysis module 126 may be configured to analyze the images received by the imaging device(s) 104 using one or more image processing techniques to allow the controller 102 to estimate or determine the size(s) of one or more soil clods present on the surface of the field currently being processed. Specifically, in several embodiments, the image analysis module 126 may be configured to implement one or more image processing techniques that allow the controller 102 to identify the edge(s) and/or the perimeter(s) of one or more soil clods present within each image (or within a subset of the images). For example, in one embodiment, the image analysis module 126 may be configured to implement one or more edge detection techniques to allow the controller 102 to locate at least one edge of each of one or more soil clods present within each image. Thereafter, in such an embodiment, the image analysis module 126 may be configured to implement one or more boundary-tracing techniques to allow the controller 102 to identify the perimeter(s) of the soil clod(s) based on the located edge(s). As will be described below, after identifying the edge(s) and/or the perimeter(s) of the soil clod(s) present within each image, the controller 102 may be configured to determine the size(s) of the soil clod(s).

It should be appreciated that the image analysis module 126 may be configured to implement any suitable image processing techniques that allow the controller 102 to identify the edge(s) and/or the perimeter(s) of soil clod(s) present within each image (or subset of images). As mentioned above, the image analysis module 126 may be configured to implement an edge detection technique(s) to allow the controller 102 to locate the soil clod edge(s). Such edge detection technique(s) may include the Canny technique, the Sobel technique, the Fuzzy Logic technique, and/or the like. Moreover, as mention above, the image analysis module 126 may be configured to implement a boundary-tracing technique(s) to allow the controller 102 to identify the perimeter(s) of the soil clod(s) based on the identified edge(s). Such boundary-tracing technique(s) may include the Square Tracing technique, the Moore-Neighbor technique, the Radial Sweep technique, and/or the like. However, in alternative embodiments, image analysis module 126 may be configured to implement any other suitable image processing techniques.

Figure 4:
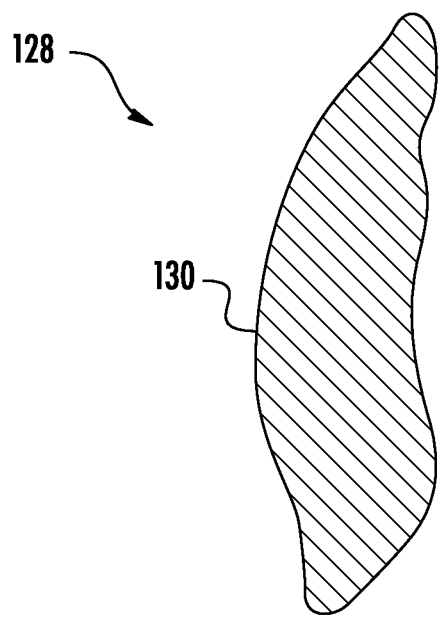
FIG. 4 illustrates an example view of a soil clod in accordance with aspects of the present subject matter, particularly illustrating the area enclosed by a perimeter of the soil clod.
Figure 5:
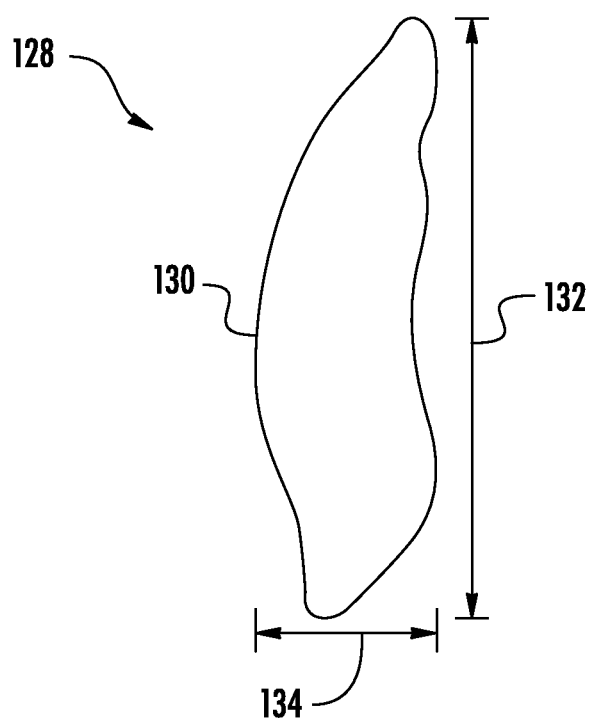
FIG. 5 illustrates another example view of a soil clod in accordance with aspects of the present subject matter, particularly illustrating a plurality of dimensions of the perimeter of the soil clod.

Additionally, as indicated above, the image analysis module 126 may be configured to determine the size(s) of the soil clod(s) present within each image based on the identified edge(s) and/or perimeter(s) of such clod(s). Specifically, in one embodiment, the image analysis module 126 may be configured to determine the size(s) of the soil clod(s) based on the area(s) enclosed by such soil clod(s). For example, FIG. 4 illustrates an example view of a soil clod 128 having a perimeter 130. In such an embodiment, the image analysis module 126 may be configured to determine the area (e.g., as indicated by the cross-hatching shown in FIG. 4) enclosed by the perimeter 130 of the soil clod 128, with the size of the soil clod 128 corresponding to the determined area. In another embodiment, the image analysis module 126 may be configured to determine the size(s) of the soil clod(s) based on the maximum dimension(s) of such soil clod(s). For example, FIG. 5 illustrates another example view of the soil clod 128 shown in FIG. 4. As shown, the soil clod 128 may have a length (e.g., as indicated by arrow 132 in FIG. 5) and a width (e.g., as indicated by arrow 134 in FIG. 5), with the length 132 being greater than the width 134. In such an embodiment, the image analysis module 126 may be configured to determine the length 132 and width 134 associated with the perimeter 130 of the soil clod 128, with the length 132 corresponding to the size of the soil clod 128. However, in alternative embodiments, the image analysis module 126 may be configured to any other suitable dimensions (e.g., a diagonal dimension) or combination of dimensions associated with the identified perimeter(s) of the soil clod(s), with the largest of such determined dimensions corresponding to the size(s) of the soil clod(s).

Referring again to FIG. 3, the instructions 116 stored within the memory 112 of the controller 102 may also be executed by the processor(s) 110 to implement a control module 136. In general, the control module 136 may be configured to adjust the operation of the work vehicle 10 and/or the implement 12 by controlling one or more components of the implement/vehicle 12, 10. Specifically, in several embodiments, the control module 136 may be configured to adjust one or more operating parameters of the vehicle 10 and/or the implement 12 based on the determined soil clod size(s). For example, in one embodiment, when the soil clod size(s) determined by the controller 102 exceeds a maximum soil clod size threshold, the control module 136 may be configured to fine-tune the operation of the work vehicle 10 and/or the implement 12 in a manner designed to adjust the sizes of the soil clods present on the surface of the field. For instance, when it is determined that the soil clod size(s) exceeds the maximum soil clod size threshold (thereby indicating that the soil clod(s) present within the field are too large), the control module 136 may be configured to adjust the operation of the work vehicle 10 and/or the implement 12 to decrease the size of the soil present within the field.

It should be appreciated that the controller 102 may be configured to implement various control actions to adjust the operation of the work vehicle 10 and/or the implement 12 in a manner that adjusts the sizes of the soil clods present within the field. In one embodiment, the controller 102 may be configured to increase or decrease the operational or ground speed of the implement 12 to affect a decrease in the soil clod sizes. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the work vehicle 10 and, thus, the ground speed of the implement 12, such as by transmitting suitable control signals for controlling an engine or speed governor (not shown) associated with the engine 22 and/or transmitting suitable control signals for controlling the engagement/ disengagement of one or more clutches (not shown) provided in operative association with the transmission 24.

In addition to the adjusting the ground speed of the vehicle/implement 10/12 (or as an alternative thereto), the controller 102 may also be configured to adjust one or more operating parameters associated with the ground-engaging tools of the implement 12. For instance, as shown in FIG. 3, the controller 102 may be communicatively coupled to one or more valves 138 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 102 may automatically adjust the penetration depth, the down force, and/or any other suitable operating parameter associated with the ground-engaging tools of the implement 12. For example, in one embodiment, when it is determined that the soil clod size(s) has exceeded the maximum soil clod size threshold (thereby indicating that the soil clod(s) present within the field are too large), the controller 102 may be configured to control the valve(s) 138 in a manner that increases the force applied to the basket assemblies 54 by the actuators 60.

Moreover, as shown in FIG. 3, the controller 102 may also include a communications interface 140 to provide a means for the controller 102 to communicate with any of the various other system components described herein. For instance, one or more communicative links or interfaces 142 (e.g., one or more data buses) may be provided between the communications interface 140 and the imaging device(s) 104 to allow images transmitted from the imaging device(s) 104 to be received by the controller 102. Similarly, one or more communicative links or interfaces 144 (e.g., one or more data buses) may be provided between the communications interface 140 and the positioning device(s) 124 to allow the location information generated by the positioning device(s) 124 to be received by the controller 102. Additionally, as shown in FIG. 3, one or more communicative links or interfaces 146 (e.g., one or more data buses) may be provided between the communications interface 140 and the engine 22, the transmission 24, the control valves 138, and/or the like to allow the controller 102 to control the operation of such system components.

Figure 6:
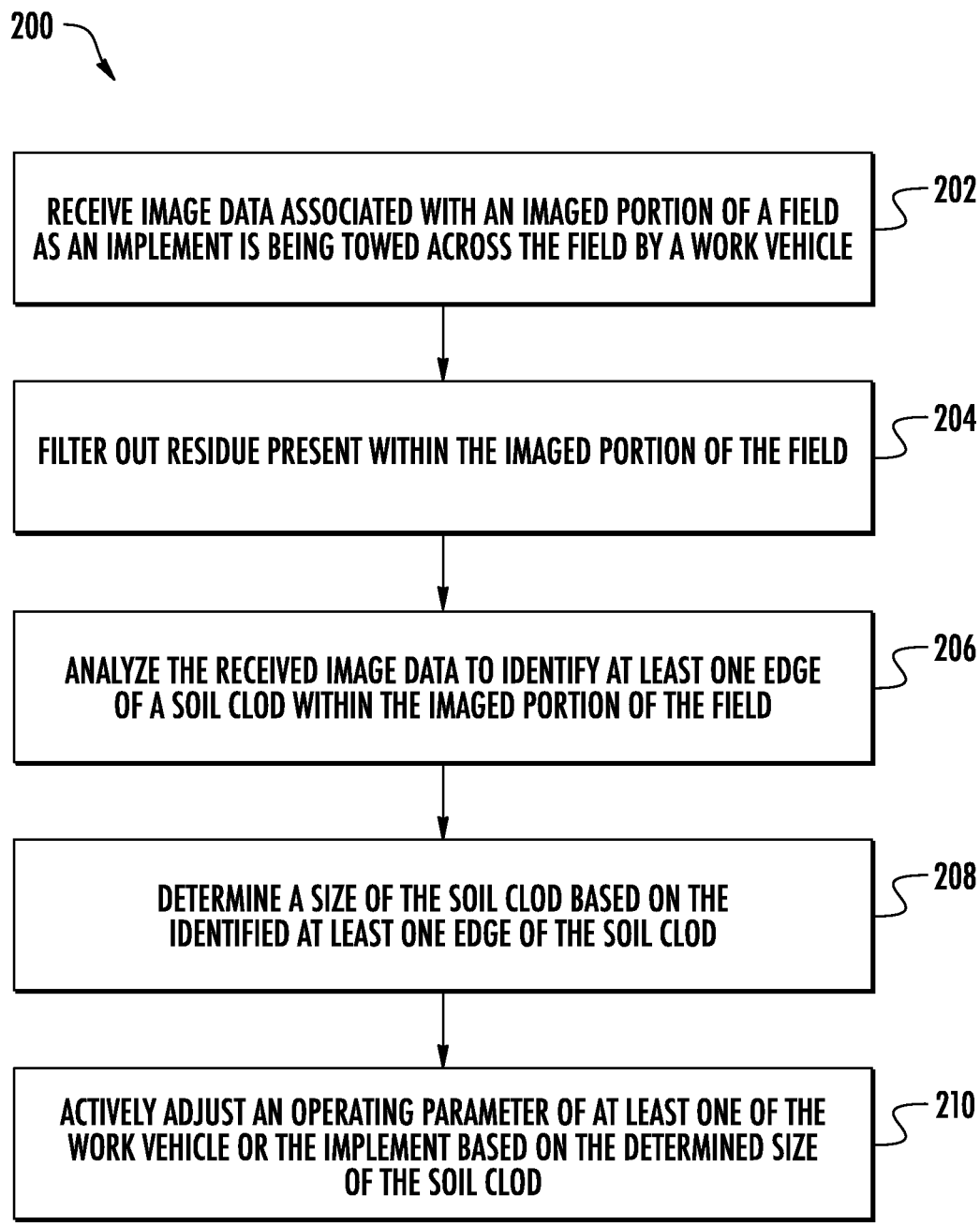
FIG. 6 illustrates a flow diagram of one embodiment of a method for determining soil clod size as an implement is being towed across a field by a work vehicle in accordance with aspects of the present subject matter.

Referring now to FIG. 6, a flow diagram of one embodiment of a method 200 for determining soil clod size as an implement is being towed across a field by a work vehicle is illustrated in accordance with aspects of the present subject matter. In general, the method 200 will be described herein with reference to the agricultural work vehicle 10 and implement 12 shown in FIGS. 1 and 2, as well as the various system components shown in FIGS. 3-5. However, it should be appreciated that the disclosed method 200 may be implemented with work vehicles having any other suitable vehicle configuration, implements having any other suitable implement configuration, and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving image data associated with an imaged portion of a field as an implement is being towed across the field by a work vehicle. As described above, the vehicle/implement 10/12 may include one or more imaging devices 104 (e.g., a camera(s)), with each imaging device 104 configured to capture images or other image data of a portion of the field within its field of view 106. In this regard, as the vehicle/implement 10/12 travels across the field to perform an agricultural operation thereon (e.g., a tillage operation), the controller 102 may be configured to receive the captured images from the imaging device(s) 104 (e.g., via the communicative link 142). As will be described below, the controller 102 may be configured to analyze the received images to determine the size(s) of one or more soil clods present within the field.

In some embodiments, the image data obtained at (202) may include a single image frame. Thus, in some embodiments, the method 200 may be performed iteratively for each new image frame as such image frame is received. For example, method 200 may be performed iteratively in real-time as new images are received from the imaging device(s) 104, while the imaging device(s) 104 are moved throughout the field (e.g., as a result of being installed on the vehicle 10 or the implement 12).

In other embodiments, the image data obtained at (202) may include a plurality of image frames. In such embodiments, the plurality of image frames may be concatenated or otherwise combined and processed as a single batch (e.g., by way of a single performance of method 200 over the batch). For example, in one embodiment, image frames from several image capture devices 104 may be concatenated to form a single image frame depicting a portion of the field aft of the implement 10 and extending the entire width of the implement 10 along a lateral direction.

Furthermore, at (204), the method 200 may include filtering out residue present within the imaged portion of the field. In certain instances, crop residue or other plant matter may be present on the surface of the field before, during, and/or after the performance of agricultural operation. The presence of such residue within the image data may make it difficult to determine the size(s) of the soil clod(s) present within the field using certain image processing techniques. As such, in several embodiments, the image analysis module 126 of the controller 102 may be configured to filter out residue depicted within the received images. In this regard, the image analysis module 126 may generally be configured to utilize any suitable image processing or image filtering techniques that allow the controller 102 to identify crop residue present on the surface of the imaged portion(s) of the field. For instance, in one embodiment, the image processing technique used by the image analysis module 126 may rely upon the differences in the reflectivity or spectral absorption between the soil and the crop residue contained within each image being analyzed. However, in alternative embodiments, the controller 102 may be configured to filter out residue depicted within the received images using any other suitable image processing technique(s) that permit the soil and the residue present within the field to be distinguished.

Additionally, as shown in FIG. 6, at (206), the method 200 may include analyzing the received image data to identify at least one edge of a soil clod within the imaged portion of the field. Specifically, as indicated above, the image analysis module 126 of the controller 102 may, in accordance with aspects of the present subject matter, be configured to implement one or more suitable image processing techniques that allow the controller 102 to identify or locate at least one edge or boundary of one or more soil clods present on the surface of the field and depicted in the received image(s). For example, in one embodiment, the image analysis module 126 may be configured to implement one or more edge detection techniques (e.g., the Canny, Sobel, and/or Fuzzy Logic techniques) to allow the controller 102 to locate the soil clod edge(s) within the received images. As will be described below, the identified edges within the received images may be used to determine the size(s) of the soil clod(s) depicted therein.

Moreover, at (208), the method 200 may include determining the size of the soil clod based on the identified at least one edge of the soil clod. Specifically, in several embodiments, the image analysis module 126 of the controller 102 may be configured to implement one or more suitable image processing techniques that allow the controller 102 to identify the perimeter(s) or boundary(ies) of the soil clod(s) depicted in the received image(s) based on the identified edge(s) of such soil clod(s). For example, as indicated above, the image analysis module 126 may be configured to implement one boundary-tracing techniques (e.g., the Square Tracing, Moore-Neighbor, and/or Radial Sweep techniques) to allow the controller 102 to identify or trace the perimeter(s) of the soil clod(s) depicted in the received image(s) based on the identified edge(s) of such soil clod(s).

In several embodiments, at (208), the method 200 may include be configured to determine the size(s) of the soil clod(s) based on the identified perimeter(s) of such soil clod(s). For example, in one embodiment, as described above with reference to FIG. 4, the image analysis module 126 of the controller 102 may be configured to implement one or more suitable image processing techniques that allow the controller 102 to determine the area(s) enclosed by the identified perimeter(s) of the soil clod(s) depicted in the received image(s). In such an embodiment, the determined area of each soil clod may correspond to its size. Additionally, in another embodiment, as described above with reference to FIG. 5, the image analysis module 126 of the controller 102 may be configured to implement one or more suitable image processing techniques that allow the controller 102 to determine a plurality of dimensions (e.g., the length and width) of the identified perimeter(s) of the soil clod(s) depicted in the received image(s). Thereafter, the controller 102 may be configured to determine the greatest determine dimension of each soil clod, with the greatest dimension corresponding to size of such soil clod.

In one embodiment, at (208), the method 200 may include determining a clod size reduction associated with the agricultural operation being performed by the implement 12. Specifically, during the performance of certain agricultural operations (e.g., a tillage operation), the soil clods present on the surface of the field may be broken up. For example, as the implement 12 is towed across the field, the basket assemblies 54 may break up the soil clods over which the basket assemblies 54 pass. As mentioned above, in some embodiments, a first imaging device 104A may be coupled to the forward end of the vehicle 10 such that the first imaging device 104A is configured to capture images of the field before the performance of the agricultural operation. Based on the pre-operation image(s) received from the first imaging device 104A, the image analysis module 126 may be configured to determine the size(s) of the pre-operation soil clod(s) as described above. Furthermore, in some embodiments, a second imaging device 104B may be coupled to the aft end of the implement 12 such that the second imaging device 104B is configured to capture images of the field after the performance of the agricultural operation. Based on the post-operation image(s) received from the second imaging device 104B, the image analysis module 126 may be configured to determine the size(s) of the post-operation soil clod(s) as described above. Thereafter, the controller 102 may be configured to compare the size(s) of the pre-operation soil clod(s) and the post-operation soil clod(s) to determine the clod size reduction (e.g., a percent reduction in the average clod size) associated with the agricultural operation.

Additionally, at (210), the method 200 may include actively adjusting an operating parameter of at least one of the work vehicle or the implement based on the determined size of the soil clod. Specifically, in several embodiments, the control module 136 of the controller 102 may be configured to adjust one or more operating parameters of the vehicle 10 and/or the implement 12, such as ground speed of the vehicle/implement 10/12 and or the force(s) applied to the ground-engaging tool(s) (e.g., the basket assemblies 54) of the implement 12, in a manner that adjusts the size(s) of the soil clod(s) within the field. For example, in one embodiment, the controller 102 may be configured to compare the determined size(s) of the soil clod(s) to a predetermined maximum clod size. Thereafter, when the determined size(s) of the soil clod(s) exceeds the predetermined maximum clod size (thereby indicating that the soil clod(s) is too large), the control module 136 may be configured to adjust the operating parameter(s) of the vehicle 10 and/or the implement 12 in a manner that reduces the size(s) of the soil clod(s) within the field It is to be understood that the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 200, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining soil clod size as an implement is being towed across a field by a work vehicle, the system comprising:
an imaging device provided in operative association with one of the work vehicle or the implement such that the imaging device is configured to capture images of the field; and
a controller communicatively coupled to the imaging device, the controller including a processor and associated memory, the memory storing instructions that, when implemented by the processor, configure the controller to:
receive, from the imaging device, image data associated with an imaged portion of the field;
filter out residue depicted within the received image data;
after filtering out the residue, identify at least one edge of a soil clod within the imaged portion of the field based on the received image data;
after identifying the at least one edge, identify, using a boundary-tracing technique, a perimeter of the soil clod based on the identified at least one edge; and
determine a size of the soil clod based on the identified perimeter of the soil clod.

2. The system of claim 1, wherein, when determining the size of the soil clod, the controller is further configured to determine the size of the soil clod based on an area enclosed by the identified perimeter of the soil clod.

3. The system of claim 1, wherein, when determining the size of the soil clod, the controller is further configured to determine the size of the soil clod based on a maximum dimension of the identified perimeter of the soil clod.

4. The system of claim 1, wherein, when identifying the at least one edge of the soil clod, the controller is further configured to locate, using an edge-finding technique, the at least one edge of the soil clod within the imaged portion of the field.

5. The system of claim 1, wherein the controller is further configured to actively adjust an operating parameter of at least one of the work vehicle or the implement based on the determined size of the soil clod.

6. The system of claim 1, wherein the operating parameter comprises at least of a ground speed of the work vehicle or a force being applied to a ground-engaging tool of the implement.

7. The system of claim 1, wherein the controller is further configured to actively adjust an operating parameter of the at least one of the work vehicle or the implement when it is determined that the size of the soil clod has exceeded a predetermined maximum clod size.

8. The system of claim 1, wherein the imaging device corresponds to a first imaging device positioned at a forward end of the work vehicle such that the captured images of the field comprise pre-operation images and the soil clod comprises a pre-operation soil clod, the controller further configured to determine the size of the pre-operation soil clod based at least in part on the identified perimeter of the pre-operation soil clod.

9. The system of claim 8, further comprising:
a second imaging device positioned at an aft, end of the implement such that the second imaging device is configured to capture post-operation images of the field, the controller further configured to:
receive, from the second imaging device, post-operation image data associated with an imaged post-operation portion of a field surface of the field;
identify at least one edge of a post-operation soil clod within the imaged post-operation portion of the field based on the received post-operation image data;
after identifying the at least one edge, identify, using a boundary-tracing technique, a perimeter of the post-operation soil clod based on the identified at least one edge; and
determine a size of the post-operation soil clod based on the identified perimeter of the post-operation soil clod.

10. The system of claim 9, wherein the controller is further configured to determine a clod size reduction associated with the operation based on a differential between the size of the pre-operation soil clod and the size of the post-operation soil clod.

11. The system of claim 1, wherein the imaging device corresponds to at least one of a camera or a LIDAR device.

12. A method for determining soil clod size as an implement is being towed across a field by a work vehicle, the method comprising:
receiving, with one or more computing devices, image data associated with an imaged portion of a field as the implement is being towed across the field by the work vehicle;
filtering out, with the one or more computing device, residue depicted within the received image data:
after filtering out the residue, identifying, with the one or more computing devices, at least one edge of a soil clod within the imaged portion of the field based on the received image data;
after identifying the at least one edge, identifying, with the one or more computing devices, a perimeter of the soil clod based on the identified at least one edge using a boundary-tracing technique; and
determining, with the one or more computing devices, a size of the soil clod based on the identified perimeter of the soil clod.

13. The method of claim 12, wherein determining the size of the soil clod comprises determining, with the one or more computing devices, the size of the soil clod based on an area enclosed by the identified perimeter of the soil clod.

14. The method of claim 12, wherein determining the size of the soil clod comprises determining, with the one or more computing devices, the size of the soil clod based on a maximum dimension of the identified perimeter of the soil clod.

15. The method of claim 12, wherein identifying the at least one edge of the soil clod comprises locating, with the one or more computing devices, the at least one edge of the soil clod within the imaged portion of the field using an edge-finding technique.

16. The method of claim 12, further comprising:
actively adjusting, with the one or more computing devices, an operating parameter of the at least one of the work vehicle or the implement based on the determined size of the soil clod.

17. The method of claim 12, wherein the received image data comprises pre-operation image data and the soil clod comprises a pre-operation soil clod, the method further comprising:

determining, with the one or more computing devices, the size of the pre-operation soil clod based at least in part on the identified perimeter of the pre-operation soil clod;

receiving, with the one or more computing devices, post-operation image data associated with an imaged post-operation portion of the field;

identifying, with the one or more computing devices, at least one edge of a post-operation soil clod within the imaged post-operation portion of the field based on the received post-operation image data;

after identifying the at least one edge, identifying, with the one or more computing devices, a perimeter of the post-operation soil clod based on the identified at least one edge using a boundary-tracing technique;

determining, with the one or more computing devices, a size of the post-operation soil clod based on the identified perimeter of the post-operation soil clod; and determining, with the one or more computing devices, a clod size reduction associated with the agricultural operation based on a differential between the size of the pre-agricultural operation soil clod and the size of the post-agricultural operation soil clod.

18. The system of claim 2, wherein, when determining the size of the soil clod, the controller is further configured to:
determine a plurality of dimensions of the identified perimeter of the soil clod; and
determine a maximum dimension of the determined plurality of dimensions, the determined maximum dimension corresponding to the size of the soil clod.

19. The system of claim 2, wherein determining the size of the soil clod comprises further configured to:
determining, with the one or more computing devices, a plurality of dimensions of the identified perimeter of the soil clod; and
determining, with the one or more computing devices, a maximum dimension of the determined plurality of dimensions, the determined maximum dimension corresponding to the size of the soil clod.

* * * * *